US011214669B2

(12) United States Patent
Kim et al.

(10) Patent No.: US 11,214,669 B2
(45) Date of Patent: Jan. 4, 2022

(54) POLYOLEFIN RESIN COMPOSITION AND STRETCH FILM USING THE SAME

(71) Applicant: LG Chem, Ltd., Seoul (KR)

(72) Inventors: Daehwan Kim, Daejeon (KR); Yi Young Choi, Daejeon (KR); Hyunsup Lee, Daejeon (KR); Soon Ho Sun, Daejeon (KR); Jong Young Bae, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/633,468

(22) PCT Filed: Mar. 20, 2019

(86) PCT No.: PCT/KR2019/003247
§ 371 (c)(1),
(2) Date: Jan. 23, 2020

(87) PCT Pub. No.: WO2019/182352
PCT Pub. Date: Sep. 26, 2019

(65) Prior Publication Data
US 2020/0172713 A1 Jun. 4, 2020

(30) Foreign Application Priority Data

Mar. 21, 2018 (KR) .......... 10-2018-0032576
Mar. 19, 2019 (KR) .......... 10-2019-0031058

(51) Int. Cl.
*C08F 210/16* (2006.01)
*C08L 23/06* (2006.01)
*C08L 23/08* (2006.01)
*C08F 4/6592* (2006.01)

(52) U.S. Cl.
CPC ...... *C08L 23/0815* (2013.01); *C08F 4/65925* (2013.01); *C08F 210/16* (2013.01); *C08L 23/06* (2013.01); *C08F 2420/01* (2013.01); *C08L 2203/16* (2013.01); *C08L 2205/02* (2013.01)

(58) Field of Classification Search
CPC .. C08L 23/06; C08L 23/0815; C08L 2205/02; C08L 2203/16; C08F 110/02; C08F 210/16; C08F 2500/12; C08F 2500/10
See application file for complete search history.

(56) References Cited

U.S. PATENT DOCUMENTS

| | | | |
|---|---|---|---|
| 5,847,053 A * | 12/1998 | Chum | C08F 10/02 525/240 |
| 5,882,750 A | 3/1999 | Mink et al. | |
| 6,110,599 A * | 8/2000 | Edwards | C09D 123/0815 428/461 |
| 6,403,181 B1 | 6/2002 | Barry et al. | |
| 6,503,637 B1 * | 1/2003 | Loon | B32B 27/32 428/516 |
| 7,151,145 B1 | 12/2006 | Reinking | |
| 7,232,866 B2 * | 6/2007 | Houpert | C08F 10/02 525/240 |
| 7,235,607 B2 * | 6/2007 | Ohlsson | B65B 53/00 428/335 |
| 7,332,543 B2 * | 2/2008 | Follestad | C08L 23/0815 525/191 |
| 8,318,862 B2 * | 11/2012 | Michie, Jr. | C08J 5/18 525/191 |
| 8,344,068 B2 * | 1/2013 | Michie, Jr. | C08L 23/26 525/191 |
| 8,679,602 B2 * | 3/2014 | Michie, Jr. | C08F 210/16 428/35.2 |
| 10,377,887 B2 * | 8/2019 | Wang | C08L 23/06 |
| 10,538,654 B2 * | 1/2020 | Wang | C08J 5/18 |
| 2008/0166535 A1 | 7/2008 | Berthold et al. | |
| 2009/0246433 A1 | 10/2009 | Michie et al. | |
| 2009/0283939 A1 | 11/2009 | Turner et al. | |
| 2010/0003439 A1 | 1/2010 | Michie, Jr. et al. | |
| 2010/0113698 A1 * | 5/2010 | Walton | C08L 23/0815 525/88 |
| 2011/0034635 A1 | 2/2011 | Kapur et al. | |
| 2011/0318559 A1 | 12/2011 | Berthold et al. | |
| 2017/0044278 A1 | 2/2017 | Lee et al. | |
| 2017/0233511 A1 | 8/2017 | Sun et al. | |
| 2017/0291969 A1 | 10/2017 | Lee et al. | |
| 2018/0223009 A1 | 8/2018 | Kim et al. | |

FOREIGN PATENT DOCUMENTS

| | | | |
|---|---|---|---|
| CN | 101107309 | A | 1/2008 |
| CN | 101124264 | A | 2/2008 |
| CN | 101443405 | A | 5/2009 |
| CN | 101568586 | A | 10/2009 |
| CN | 101965368 | A | 2/2011 |
| CN | 105164200 | A | 12/2015 |
| EP | 2799487 | A1 | 11/2014 |

(Continued)

OTHER PUBLICATIONS

Extended European Search Report with Written Opinion for Application No. 19770531.2 dated Jun. 26, 2020, 7 pages.
Baum, The Mechanism of Polyethylene Oxidation, Journal of Applied Polymer Science, Received Jul. 1959, pp. 281-288, vol. 11, issue No. 6.
International Search Report for Application No. PCT/KR2019/003247, dated Jul. 3, 2019, pp. 1-4.
Written Opinion for Application No. PCT/KR2019/003247, dated Jul. 3, 2019, pp. 1-5.

(Continued)

*Primary Examiner* — Rip A Lee
(74) *Attorney, Agent, or Firm* — Lerner, David, Littenberg, Krumholz & Mentlik, LLP

(57) ABSTRACT

The present invention provides polyolefin resin composition exhibiting excellent long term durability as well as improved properties, and an article prepared using the same.

18 Claims, 2 Drawing Sheets

(56) References Cited

FOREIGN PATENT DOCUMENTS

| | | |
|---|---|---|
| JP | 2002220499 A | 8/2002 |
| JP | 3952418 B2 | 8/2007 |
| JP | 2016050222 A | 4/2016 |
| KR | 20040018709 A | 3/2004 |
| KR | 100490834 B1 | 5/2005 |
| KR | 20070100294 A | 10/2007 |
| KR | 20070115922 A | 12/2007 |
| KR | 20100102854 A | 9/2010 |
| KR | 20120038798 A | 4/2012 |
| KR | 20130051467 A | 5/2013 |
| KR | 20140002351 A | 1/2014 |
| KR | 20150144281 A | 12/2015 |
| KR | 20160029704 A | 3/2016 |
| KR | 20160030981 A | 3/2016 |
| KR | 20160038825 A | 4/2016 |
| KR | 20160123123 A | 10/2016 |
| KR | 20180027673 A | 3/2018 |
| WO | 97002294 A1 | 1/1997 |
| WO | 2008051824 A2 | 5/2008 |
| WO | 2015051880 A1 | 4/2015 |

OTHER PUBLICATIONS

Chinese Search Report for Application No. 201980003223.4 dated Nov. 1, 2021, 3 Pages.
Jancar, J. et al., "Effect of thermal history on the mechanical properties of three polypropylene impact-coplymers," Polymer Degredation and Stability, May 2011, pp. 1546-1556, vol. 96, Elsevier Ltd.
Zipeng, C. et al., "The mechanism property analysis of uniaxial tensile experimental about the high density polyethylene," ACTA Scientiarum Naturalium Universitatis Sunyatsenl, Nov. 2016, pp. 103-108, vol. 55, No. 6. (Providing English Translation of Abstract only).

* cited by examiner

【Fig. 1】
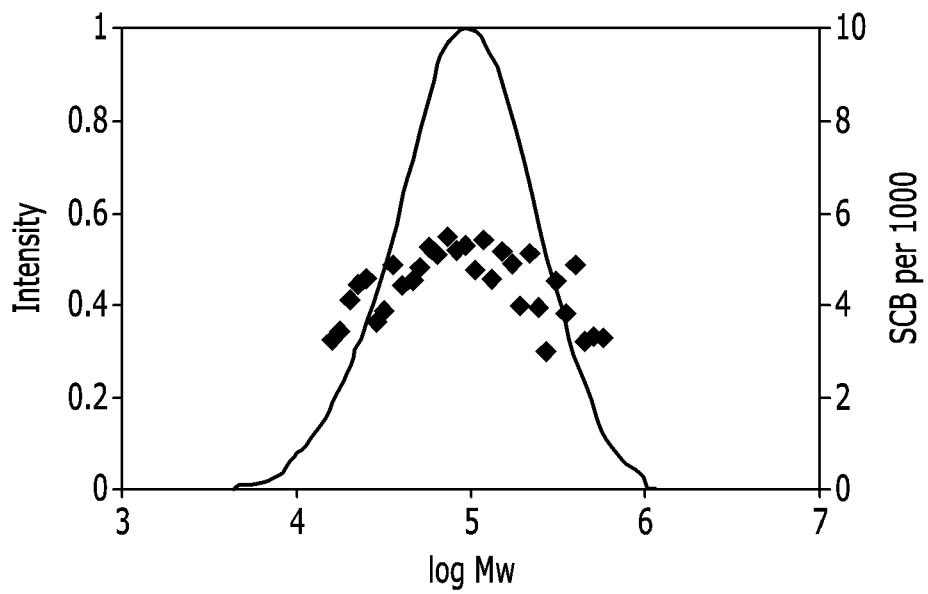
【Fig. 2】
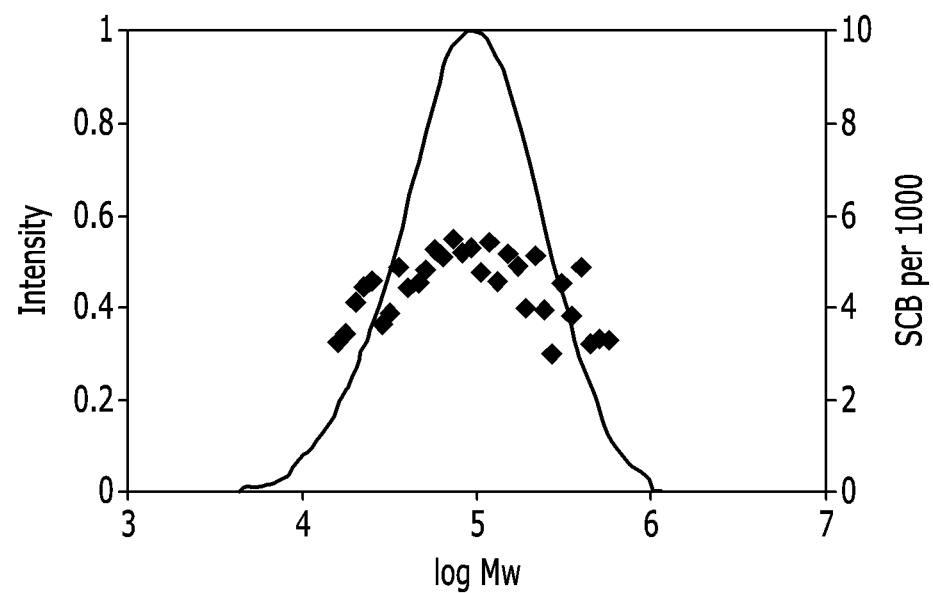

【Fig. 3】
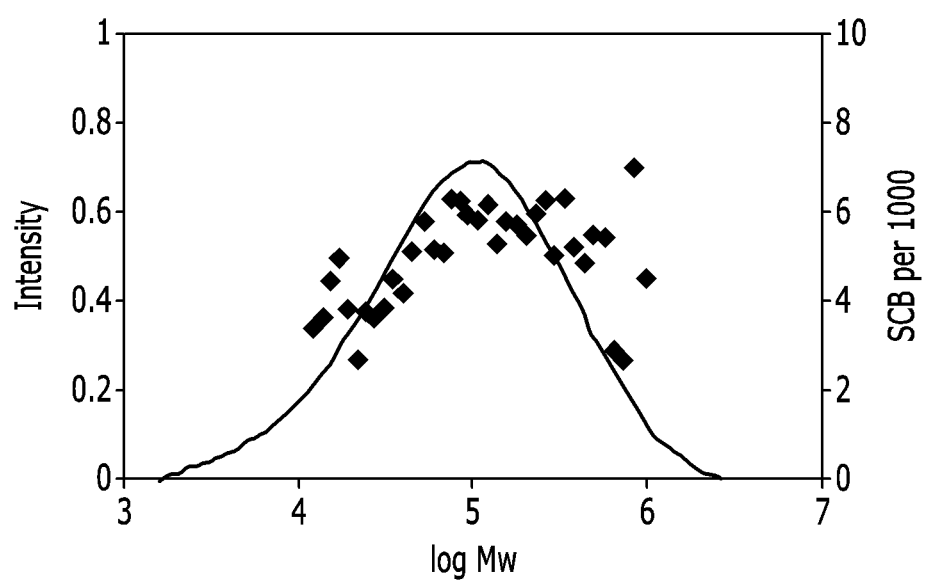

POLYOLEFIN RESIN COMPOSITION AND STRETCH FILM USING THE SAME

CROSS-REFERENCE TO RELATED APPLICATIONS

This present application is a national phase entry under 35 U.S.C. § 371 of International Application No. PCT/KR2019/003247 filed Mar. 20, 2019, which claims priority from Korean Patent Application No. 10-2018-0032576 filed on Mar. 21, 2018 and Korean Patent Application No. 10-2019-0031058 filed on Mar. 19, 2019, all of which are herein incorporated by reference.

TECHNICAL FIELD

The present invention relates to a polyolefin resin composition exhibiting excellent long term durability as well as improved properties, and a stretch film prepared using the same.

BACKGROUND ART

A stretch film is commonly used as a packaging film that fixes various articles during transportation and storage, and simultaneously, prevents damage from external moisture and pollutants. Thus, for a stretch film, durability, anti-fouling property and moisture-proofness are required as well as a thin thickness.

Although polyethylene, polyvinylchloride or polybutadiene, and the like are commonly used when preparing a stretch film, they have low durability, and thus, the film may be easily torn during transportation or packaging, or articles inside the film may be damaged due to the permeation of moisture.

Thus, a method of using linear low density polyethylene resin having excellent strength and rigidity has been suggested, and recently, the use of linear low density polyethylene resin that is prepared with a metallocene catalyst and has more excellent strength and rigidity is increasing. However, although the linear low density polyethylene resin prepared with a metallocene catalyst exhibits excellent strength and rigidity, it may increase extruder motor load due to the melting characteristics, thus deteriorating productivity.

And, a method of using high tenacity resin in combination with polyethylene resin has been suggested, but when preparing products such as a bale net, long term durability may be decreased.

Factors influencing long term durability are the properties of resin itself and additives. Although conventional high tenacity resin has narrow melt flow rate ratio (MRFF) and thus has excellent initial properties, it has low long term durability due to high internal stress and the resulting shear stress during dynamic mechanical analysis (DMA). And, since resin having narrow MFRR has hard resin crystals, even if additives are used to improve this, it may be difficult for the additives to penetrate.

DISCLOSURE

Technical Problem

It is an object of the present invention to provide a polyolefin resin composition exhibiting excellent long term durability as well as improved properties, and a method for preparing the same.

It is another object of the present invention to provide articles such as a stretch film or a bale net, and the like prepared using the polyolefin resin composition.

Technical Solution

According to one embodiment of the invention, a polyolefin resin composition is provided, which comprises i) homopolyethylene (HOMO) having melt index of 0.8 g/10 min or less (measured at 190° C. under a load of 2.16 kg according to ASTM D1238); and ii) ethylene copolymer (COMO) comprising a repeat unit derived from alpha olefin having a carbon number of 4 or more, having melt index of 0.5 g/10 min or less (measured at 190° C. under a load of 2.16 kg according to ASTM D1238), and having average short chain branch (SCB) number per 1,000 carbon atoms, of 6 or less, in a molecular weight distribution graph measured by GPC-FTIR;

at a weight ratio of 3:1 to 1:3, wherein the composition fulfills the following requirements 1) to 5):

1) density (measured according to ASTM D1505): 0.930 to 0.960 g/cc
2) melt index (measured at 190° C. under a load of 2.16 kg according to ASTM D1238): 0.1 to 0.5 g/10 min
3) melt flow rate ratio ($MI_5/MI_{2.16}$): less than 3.1
4) molecular weight distribution: 2.5 to 4.2
5) normalized viscosity according to the following Equation 1: 20 to 30%

$$\text{normalized viscosity} = \left(\frac{Mf - Mi}{Mi}\right) \times 100 \quad \text{[Equation 1]}$$

Mi: the initial viscosity of a polyolefin resin composition (measured at 240° C., under oxygen free conditions)

Mf: the viscosity of a polyolefin resin composition, measured after the polyolefin resin composition is stored at 240° C. for 2,000 seconds under the presence of oxygen.

The terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Throughout the specification, "olefin polymer" may be ethylene homopolymer, or it may refer to copolymer of ethylene and alpha olefin, comprising plural repeat unit blocks or segments that can be distinguished in the polymer because the physical or chemical properties, for example, one or more property values such as the contents (mole fractions) of the repeat units respectively derived from ethylene or propylene, and alpha olefin, crystallinity, density, or melting point, and the like are different from each other.

And, the "polymer chain(s)" included in the "olefin polymer" may refer to many polymer chains formed when the olefin polymer is polymerized and prepared. The molecular weight of such polymer chains may be confirmed through a molecular weight distribution curve using gel permeation chromatography (GPC). And, the distribution of SCB (Short Chain Branch) in the polymer chain may be confirmed by analyzing the block copolymer with Fourier Transform Infrared Spectroscopy (FT-IR). And, the content of the polymer chain may be confirmed through 1H-Nuclear Magnetic Resonance spectroscopy (1H-NMR). Such polymer chains may be defined as "polymer chain(s)" included in the "olefin polymer".

And, the "SCB (short chain branch)" in the "olefin polymer" may refer to chains having a carbon number of 4 or more, more specifically, a carbon number of 4 to 7, or 4 to 6, or 4, bonded in the form of branches to the longest main chain, in the above explained polymer chain(s). The number of SCB may be calculated by analyzing a molecular weight distribution graph measuring the olefin polymer with GPC-FTIR.

Hereinafter, a polyolefin resin composition, a method for preparing the same, and an article using the same according to the embodiments of the invention will be explained.

In the present invention, homopolyethylene (HOMO) that does not include SCB and has low MI is used when preparing a polyolefin resin composition for a stretch film, thereby improving long term durability, and simultaneously, in order to compensate the problem of processibility deterioration due to the use of the homopolyethylene (HOMO), ethylene copolymer (COMO) that has low MI and optimized SCB content through the control of hydrogen input during polymerization is used in combination, and thereby, MRFF of the resin composition becomes narrow, and MI decreases, thus exhibiting excellent long term durability, and simultaneously, improving the properties such as mechanical strength and processibility, and the like.

Specifically, the polyolefin resin composition according to one embodiment of the invention comprises:

i) homopolyethylene having melt index of 0.8 g/10 min or less (measured at 190° C. under a load of 2.16 kg according to ASTM D1238); and ii) ethylene copolymer comprising repeat units derived from alpha olefin having a carbon number of 4 or more, having melt index of 0.5 g/10 min or less (measured at 190° C. under a load of 2.16 kg according to ASTM D1238), and having average short chain branch (SCB) number per 1,000 carbon atoms, of 6 or less, in a molecular weight distribution graph measured by GPC-FTIR;

at a weight ratio of 3:1 to 1:3, and thereby, the composition fulfills the following requirements 1) to 5):

1) density (measured according to ASTM D1505): 0.930 to 0.960 g/cc 2) melt index (measured at 190° C. under a load of 2.16 kg according to ASTM D1238): 0.1 to 0.5 g/10 min 3) melt flow rate ratio ($MI_5/MI_{2.16}$): less than 3.1

4) molecular weight distribution: 2.5 to 4.2

5) normalized viscosity according to the following Equation 1: 20 to 30%

$$\text{normalized viscosity} = \left(\frac{Mf - Mi}{Mi}\right) \times 100 \quad \text{[Equation 1]}$$

Mi: the initial viscosity of a polyolefin resin composition (measured at 240° C., under oxygen free conditions)

Mf: the viscosity of a polyolefin resin composition, measured after the polyolefin resin composition is stored at 240° C. for 2,000 seconds under the presence of oxygen.

i) Homopolyethylene

In the polyolefin resin composition according to one embodiment of the invention, the homopolyethylene does not include SCB, and has MI of 0.8 g/10 min or less, more specifically, 0.4 to 0.8 g/10 min through the control of hydrogen input during preparation. If the MI of the homopolyethylene exceeds 0.8 g/10 min, it may be difficult to realize long term durability, namely, the effect of improving life characteristic.

In the present invention, the MI of the homopolyethylene may be measured at 190° C. under a load of 2.16 kg according to ASTM D1238.

And, the homopolyethylene has high density as well as low MI.

Specifically, the density of the homopolyethylene, measured according to ASTM D1505, may be 0.940 g/cc or more, or 0.940 to 0.960 g/cc, specifically, 0.948 to 0.960 g/cc, more specifically, 0.948 to 0.952 g/cc. The homopolyethylene has high density, thus exhibiting excellent mechanical properties, and has high draw ratio, thus exhibiting high strength by high elongation, and thus, it may be particularly useful for the preparation of high tenacity fiber such as a rope, a fishing net, and the like.

Although the preparation method of the homopolyethylene is not specifically limited, for example, it may be prepared by polymerizing ethylene monomers using a metallocene catalyst. At this time, hydrogen gas may be optionally further introduced.

As one example of preparing homopolyethylene, in the present invention, homopolyethylene realizing the above explained properties may be prepared by polymerizing ethylene monomers while introducing hydrogen in an amount of 0.1 to 1.5 g/hr and, in the presence of a hybrid supported catalyst in which a first transition metal compound of the following Chemical Formula 1 and a second transition metal compound of the following Chemical Formula 2 are supported together in a carrier:

$(Cp^1(R^a)_x)_n(Cp^2(R^b)_y)M^1Z^1_{3-n}$      [Chemical Formula 1]

$(Cp^3(R^e)_z)B^2(J)M^2Z^2_2$      [Chemical Formula 2]

Wherein, in the Chemical Formulas 1 and 2, $M^1$, $M^2$, $Cp^1$, $Cp^2$, $Cp^3$, $R^a$, $R^b$, $R^e$, $Z^1$, $Z^2$, $B^2$, J, n, x, y and z are as defined in ii) ethylene copolymer (COMO) described below.

Specific kind and amount of the hybrid supported catalyst will be explained in more detail in ii) ethylene copolymer (COMO) described below.

And, for the polymerization reaction, various polymerization processes known as the polymerization reactions of ethylene monomers such as continuous solution polymerization, bulk polymerization, suspension polymerization, slurry polymerization, or emulsion polymerization, and the like may be used, and it may be conducted by homopolymerizing ethylene monomers using a continuous slurry polymerization reactor, a loop slurry reactor, a gas phase reactor or a solution reactor.

And, during the polymerization reaction, hydrogen may be introduced at the velocity of 0.1 to 1.5 g/hr, more specifically, 0.1 to 1.0 g/hr, or 0.2 to 0.7 g/hr, under reactor pressure of 1 atm. In case hydrogen gas is introduced in the above range, the density and MI of the prepared homopolyethylene may be controlled within the above explained ranges, while exhibiting sufficient catalytic activity. If hydrogen input does not fall within the above range, and exceeds 1.5 g/hr, MI may rapidly increase exceeding 0.8 g/10 min, and thus, it may be difficult to improve the physical properties and mechanical properties of the polyethylene resin composition comprising the same.

And, during the polymerization reaction, a temperature may be 25 to 500° C., specifically, 25 to 200° C., more specifically, 50 to 150° C. And, a polymerization pressure may be 1 to 100 Kgf/cm², specifically, 1 to 50 Kgf/cm², more specifically, 5 to 30 Kgf/cm².

The homopolyethylene may be included in the content of 25 to 75 wt %, based on the total weight of the polyolefin resin composition. If the content of the homopolyethylene is less than 25 wt %, it may be difficult to obtain the effect of improvement in aging characteristics due to the inclusion of the homopolyethylene, and if the content of the homopolyethylene is greater than 75 wt %, the resin composition may not be drawn due to lowered processability. Considering the effect of improvement in the aging characteristics of the polyolefin resin composition according to the control of the content of homopolyethylene, the homopolyethylene may be included in the content of 25 to 50 wt %, based on the total weight of the resin composition.

ii) Ethylene copolymer (COMO)

In the polyolefin resin composition according to the present invention, the ethylene copolymer is prepared by the polymerization reaction of ethylene and alpha olefins having a carbon number of 4 or more, under control of the hydrogen input during the polymerization reaction using a metallocene catalyst, and it includes repeat units respectively derived from ethylene and alpha olefin having a carbon number of 4 or more, and has MI of 0.5 g/10 min or less (measured at 190° C. under a load of 2.16 kg according to ASTM D1238), and average SCB number per 1,000 carbon atoms of 6 or less in a molecular weight distribution graph measured by GPC-FTIR.

Ethylene copolymer conventionally used for the preparation of high tenacity fiber had problems in terms of long term durability, namely, low life characteristic. Thus, a method of lowering MI has been suggested, but it was not easy to control MI with the conventional catalyst, and in case MI was lowered by decreasing hydrogen input, due to double bonds remaining in the polymer, long term durability of the resin composition was still low.

Thus, in the present invention, during the preparation of ethylene copolymer using a metallocene catalyst, hydrogen input is controlled so as to decrease MI to 0.5 g/10 min or less, thereby preventing deterioration of long term durability of the resin composition according to the generation of double bonds, and simultaneously, exhibiting excellent mechanical strength as well as excellent processability. If the MI of the ethylene copolymer exceeds 0.5 g/10 min, long term durability and mechanical properties of the resin composition may be deteriorated due to mixing with the above explained homopolyethylene. More specifically, the MI of the ethylene copolymer may be 0.1 to 0.4 g/10 min.

Meanwhile, in the present invention, as explained above, SCB is produced in the form of branch by the incorporation of alpha olefin comonomes such as 1-butene or 1-hexene into the main carbon chain during the polymerization process, and as the copolymerizability of the comonomes is higher during the polymerization process, more excellent processability may be exhibited.

And, the polyolefin resin composition according to one embodiment the present invention comprises polyethylene homopoyymer having low MI so as to improve long term durability. However, since the homopolyethylene does not include SCB, processability of the resin composition may be deteriorated. Thus, in the present invention, by optimizing SCB of the ethylene copolymer mixed with the homopolyethylene, processability may be improved simultaneously with improving life characteristics.

By decreasing hydrogen input below a certain value when preparing ethylene copolymer, the number of SCB influencing life characteristic may be decreased. Specifically, if the hydrogen input is decreased during a polymerization reaction, the amount of low molecular weight compound produced may be reduced, thus decreasing density. Thus, by decreasing comonomer input so as to afford optimum density, the number of SCB may be decreased. Specifically, in the present invention, through the control of hydrogen input, furthermore, comonomer input during the polymerization reaction, ethylene copolymer having average SCB number per 1,000 carbon atoms of 6 or less, more specifically, 3 to 6 is used, thereby exhibiting excellent properties including processability while maintaining the effect of improvement in long term durability of the resin composition. If the average SCB number per 1,000 carbon atoms exceeds 6, the effect of improvement in life characteristic due to the ethylene copolymer may be deteriorated.

And, the ethylene copolymer may have density measured according to ASTM D1505, of 0.940 to 0.950 g/cc, more specifically, 0.945 to 0.950 g/cc. If it has density in the above range while fulfilling the above described MI and SCB, it can improve the strength and rigidity when preparing a film.

Meanwhile, as the alpha olefin included in the ethylene copolymer, alpha olefins having a carbon number of 4 to 20 such as 1-butene, 1-pentene, 1-hexene, 1-octene, 1-decene, 1-dodecene, 1-tetradecene, 1-hexadecene, 1-octadecene, 4-methyl-1-pentene, and the like may be mentioned, and mixtures thereof may be included. More specifically, it may be 1-butene.

And, the alpha olefin-derived repeat units may be included in the content of 1 to 5 mol % in the ethylene copolymer. If they are included in the above content range, the ethylene copolymer may exhibit more excellent processability. However, if the content of the alpha olefin-derived repeat units is less than 1 mol %, it may be difficult to obtain processability improvement effect due to the inclusion of the alpha olefin-derived repeat units, and if it exceeds 5 mol %, life characteristic improvement effect may be deteriorated. Considering the excellent processability improvement effect due to the control of the content of the alpha olefin-derived repeat units, more preferably, the alpha olefin-derived repeat units may be included in the content of 2 to 4 mol %, based on the total weight of the copolymer.

The preparation method of the ethylene copolymer having the above explained characteristics is not specifically limited, and for example, it may be prepared by a method comprising the step of copolymerizing ethylene and alpha olefins having a carbon number of 4 or more while introducing hydrogen in an amount of 0.1 to 0.5 g/hr, in the presence of a hybrid supported catalyst in which a first transition metal compound of the following Chemical Formula 1 and a second transition metal compound of the following Chemical Formula 2 are supported together in a carrier, wherein the alpha olefins are introduced in an amount of 2.0 to 3.0 ml/min, based on the introduction of 10 kg/hr of ethylene monomers:

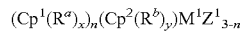  [Chemical Formula 1]

wherein, in the Chemical Formula 1, $M^1$ is Group 4 transition metal;

$Cp^1$ and $Cp^2$ are identical or different, and are each independently, cyclopentadienyl, indenyl, 4,5,6,7-tetrahydro-1-indenyl or fluorenyl radical, unsubstituted or substituted with a C1 to C20 hydrocarbon group;

$R^a$ and $R^b$ identical or different, and are each independently, hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^1$ is halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy, and when substituted, they may be substituted with C1 to C20 hydrocarbon groups;

n is 0 or 1, x and y are each independently, an integer of 0 to 4, $$(Cp^3(R^e)_z)B^2(J)M^2Z^2{}_2$$ [Chemical Formula 2]

wherein, in the Chemical Formula 2, $M^2$ is Group 4 transition metal;

$Cp^3$ is cyclopentadienyl, indenyl, 4,5,6,7-tetrahydro-1-indenyl or fluorenyl radical, unsubstituted or substituted with a C1 to C20 hydrocarbon group $R^e$ is hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^2$ is halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy, and when substituted, they may be substituted with C1 to C20 hydrocarbon groups;

$B^2$ is one or more radicals containing carbon, germanium silicon, phosphorus or nitrogen atom, or combinations thereof, which crosslink the $(Cp^3(Re)_z)$ ring with J;

J is selected from the group consisting of $NR^f$, O, $PR^f$ and S, $R^f$ is substituted or unsubstituted C1 to C20 alkyl, or substituted or unsubstituted C6 to C20 aryl, when substituted, they may be substituted with C1 to C20 hydrocarbon groups, and z is an integer of 0 to 4.

In the hybrid supported catalyst, the substituents in the Chemical Formulas 1 and 2 are as follows.

The C1 to C20 alkyl group includes linear or branched alkyl groups, and specifically, a methyl group, an ethyl group, a propyl group, an isopropyl group, an n-butyl group, a tert-butyl group, a pentyl group, a hexyl group, a heptyl group, an octyl group, and the like may be mentioned, but is not limited thereto.

The C2 to C20 alkenyl group includes linear or branched alkenyl groups, and specifically, an allyl group, an ethenyl group, a propenyl group, a butenyl group, a pentenyl group, and the like may be mentioned, but is not limited thereto.

The C6 to C20 aryl group includes monocyclic or condensed aryl groups, and specifically, a phenyl group, a biphenyl group, a naphthyl group, a phenanthrenyl group, a fluorenyl group, and the like may be mentioned, but is not limited thereto.

The C7 to C40 alkylaryl means a substituent in which one or more hydrogen of aryl are substituted by alkyl, wherein the alkyl and aryl are as defined above. Specifically, methylphenyl, ethylphenyl, n-propylphenyl, iso-propylphenyl, n-butylphenyl, tert-butylphenyl or cyclohexylphenyl, and the like may be mentioned, but is not limited thereto.

The C7 to C40 arylalkyl means a substitutent in which one or more hydrogen of alkyl are substituted by aryl, wherein the alkyl and aryl are as defined above. Specifically, benzyl, phenylpropyl or phenylhexyl, and the like may be mentioned, but is not limited thereto.

As the C1 to C20 alkoxy group, a methoxy group, an ethoxy group, a phenyloxy group, a cyclohexyloxy group, and the like may be mentioned, but is not limited thereto.

The C2 to C20 alkoxyalkyl group means a substituted in which one or more hydrogen of alkyl are substituted by alkoxy, wherein the alkyl and alkoxy are as defined above. Specifically, methoxyethyl, t-butoxyethyl, t-butoxyhexyl, and the like may be mentioned, but is not limited thereto.

The C1 to C20 hydrocarbon group may be a C1 to C20 alkyl group, a C2 to C20 alkenyl group, a C3 to C20 cycloalkyl group, a C6 to C20 aryl group, or combinations thereof, and each of them are as defined above.

The halogen may be fluorine (F), chlorine (Cl), bromine (Br) or iodine (I).

As the Group 4 transition metal, titanium, zirconium, hafnium, and the like may be mentioned, but is not limited thereto.

The first transition metal compound of the Chemical Formula 1 is useful for the preparation of low molecular weight polymer having low SCB content, and the second transition metal compound of the Chemical Formula 2 is useful for the preparation of low molecular weight polymer having medium SCB content, and if the first and second transition metal compounds are supported together in the same carried, low SCB and MI may be more easily achieved.

The first transition metal compound may be a compound represented by one of the following Structural Formulas, but is not limited thereto.

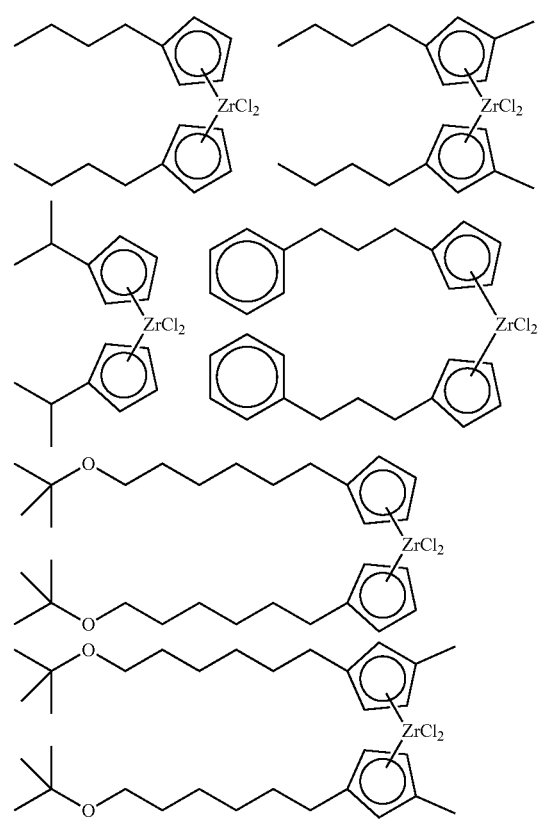

-continued

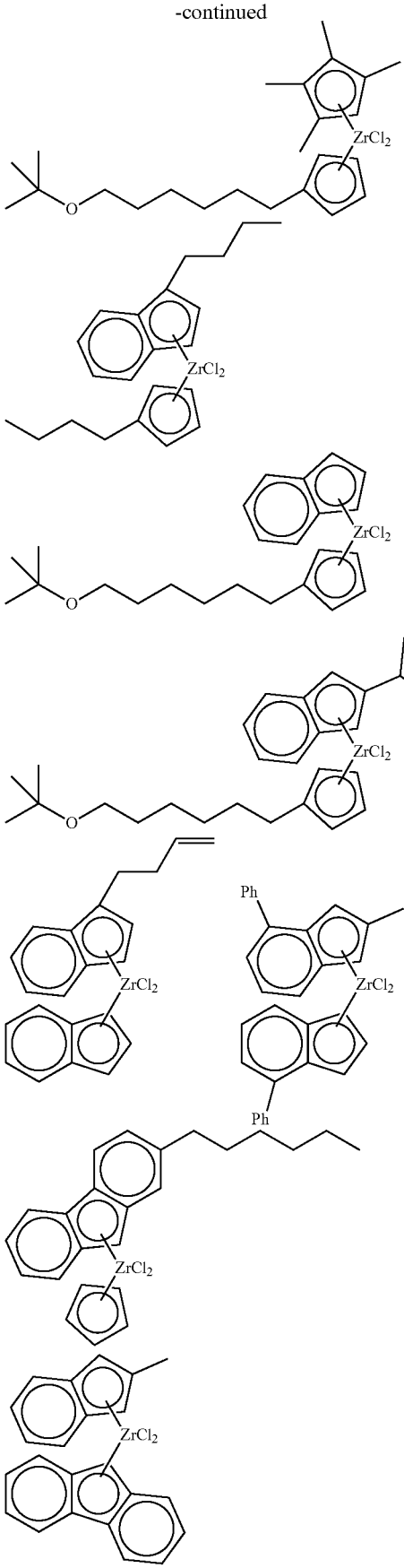

-continued

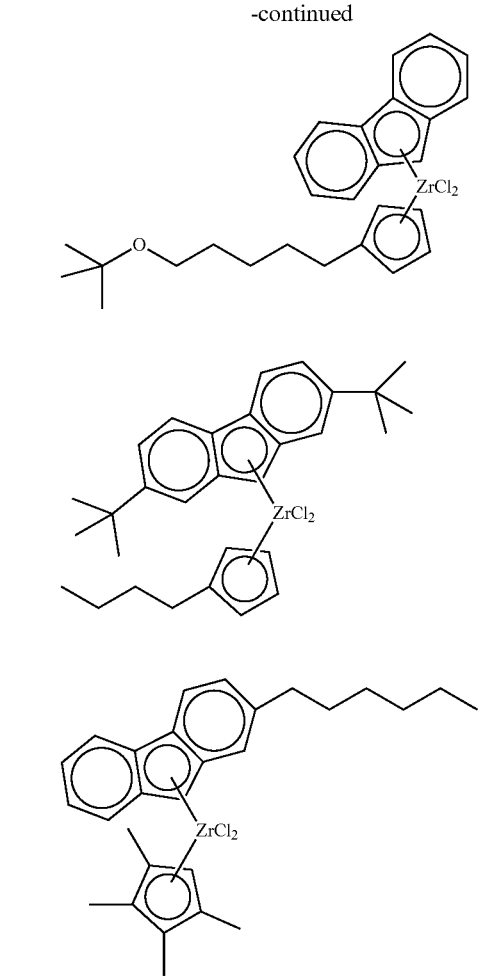

More specifically, in the first transition metal compound, in the Chemical Formula 1, $M^1$ may be Zr, and each of $Cp^1$ and $Cp^2$ may be a cyclopentadienyl group.

And, each of $Cp^1$ and $Cp^2$ may be substituted by one to four $R^a$ and $R^b$, and if each of x and y is an integer equal to or greater than 2, the plural $R^a$ and $R^b$ may be identical or different. The $R^a$ and $R^b$ may be identical or different, and each independently, hydrogen, C1-12 alkoxy, or C2-12 alkoxyalkyl, and more specifically, both $R^a$ and $R^b$ may be C2-12 alkoxyalkyl such as t-butoxyhexyl. If $R^a$ and $R^b$ are the above described substituents, the first transition metal compound may have more excellent support stability.

And, in the Chemical Formula 1, when n=1, two $Z^1$ may be identical or different, and each independently, one of halogens. The halogen group of the first transition metal compound wherein $Z^1$ is the above described substituent may be easily substituted by an alkyl group, through the reaction with a cocatalyst alkyl metal or methylaluminoxane. And, through the subsequent alkyl abstraction, the first transition metal compound may form an ionic intermediate with the cocatalyst, thereby easily providing a cationic form, which is an active species of an olefin polymerization reaction.

And, the second transition metal compound may be a compound represented by one of the following Structural Formulas, but is not limited thereto.

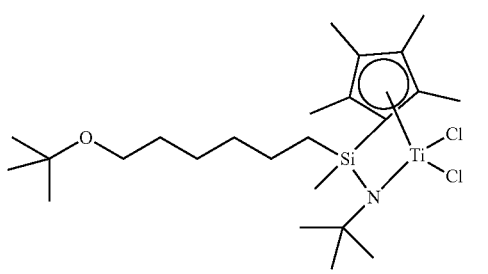

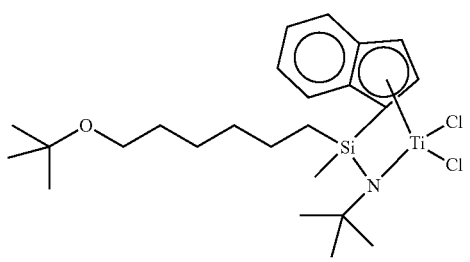

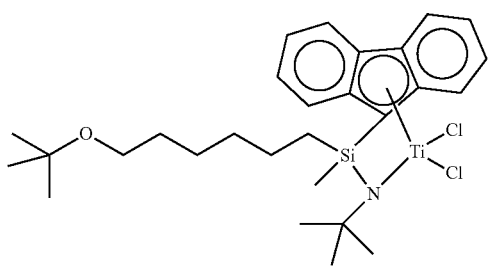

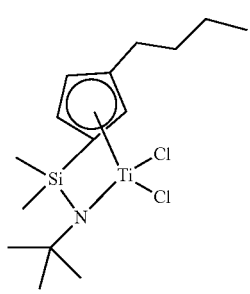

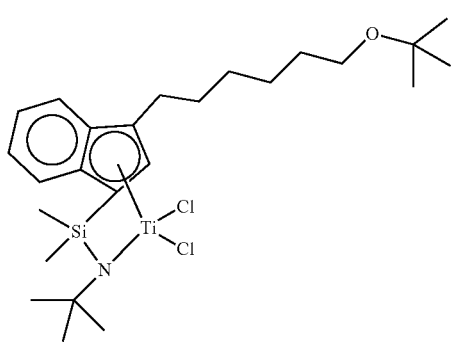

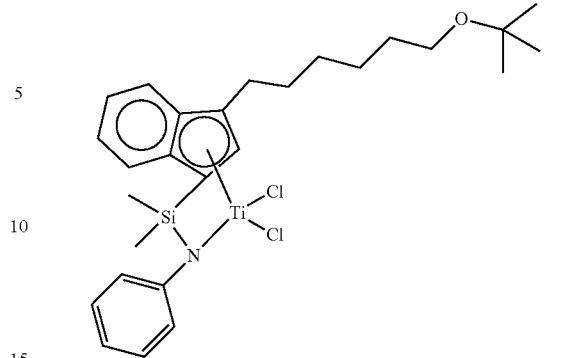

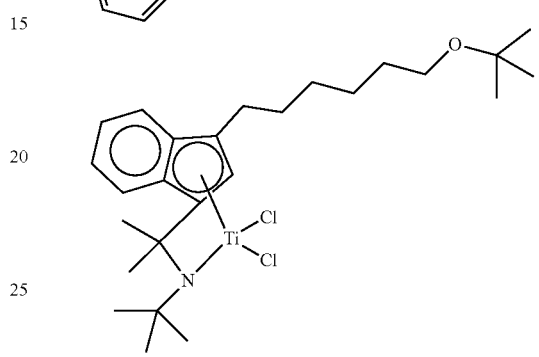

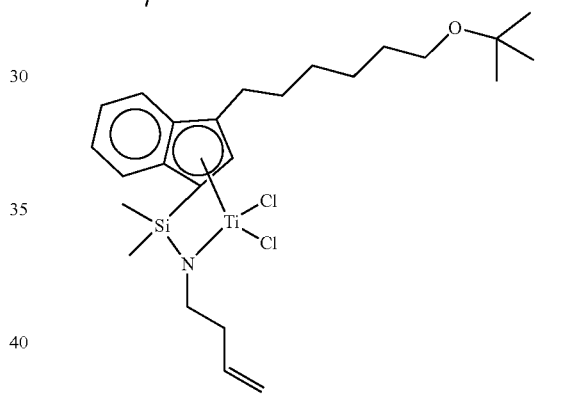

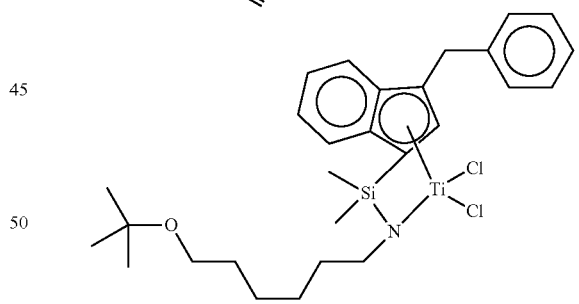

More specifically, in the second transition metal compound, in the Chemical Formula 2, $M^2$ may be Ti, and $Cp^3$ may be cyclopentadienyl.

And, $Cp^3$ may be substituted by one to four $R^e$, and if z is an integer equal to or greater than 2, $R^e$ may be identical or different, and each independently, hydrogen or C1-20 alkyl. If $R^e$ is the above described substituent, the second transition metal compound may have more excellent support stability.

And, each of $Z^2$ may be a halogen atom.

And, $B^2$ may be a silicon-containing radical, wherein the silicon-containing radical may be divalent silane substituted by hydrogen, C1-20 alkyl, C1-20 alkoxy, or C2-20 alkoxyalkyl, more specifically, it may be divalent silane substituted by C1-12 alkyl such as methyl, ethyl, and the like; or C2-20 alkoxyalkyl such as t-butoxyhexyl.

And, in the Chemical Formula 2, J may be $NR^f$, and $R^f$ may be C1-20 alkyl, more specifically, C3-12 branched alkyl such as a t-butyl group.

The second transition metal compound of the Chemical Formula 2 having the above combination of substituents may be supported in a carrier together with the first transition metal compound of the Chemical Formula 1, thus exhibiting more excellent catalytic activity, and easily realizing aimed properties by easily controlling the molecular weight distribution of homopolyethylene.

The first transition metal compound and the second transition metal compound may be included at a mole ratio of 1:0.1 to 1:0.9, or 1:0.2 to 1:0.8, or 1:0.3 to 1:0.5 in the hybrid supported catalyst. If included at the above mole ratio range, the molecular weight distribution of homopolyethylene may be easily controlled, thereby more easily realizing aimed properties.

Meanwhile, as the carrier for the hybrid supported catalyst, a carrier containing a hydroxyl group or a siloxane group on the surface may be used. Specifically, a carrier containing highly reactive hydroxyl group or siloxane group by the removal of moisture on the surface by high temperature drying may be used. More specifically, as the carrier, silica, alumina, magnesia or a mixture thereof may be used. The carrier may be dried at high temperature, and may be commonly those including oxide, carbonate, sulfate, nitrate components such as $Na_2O$, $K_2CO_3$, $BaSO_4$ and $Mg(NO_3)_2$, and the like. And, the carrier may be included at 10 to 1,000 weight ratio, more specifically 10 to 500 weight ratio, based on 1 weight ratio of the metallocene compound including the first and second transition metal compounds. When included in the above weight ratio range, the hybrid supported catalyst prepared may have an optimum shape, thus exhibiting more excellent catalytic activity.

And, in the hybrid supported catalyst, a cocatalyst may be further included so as to activate catalyst precursor transition metal compounds. As the cocatalyst, those commonly used in the art may be used without specific limitations. As non-limiting examples, the cocatalyst may be one or more compounds selected from the group consisting of compounds represented by the following Chemical Formulas 3 to 5.

The hybrid supported catalyst may further include one or more cocatalysts selected from the group consisting of compounds represented by the following Chemical Formulas 3 to 5:

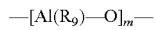 [Chemical Formula 3]

wherein, in the Chemical Formula 3, $R_9$ may be identical or different, and are each independently, halogen; a C1 to C20 alkyl group; or a C1 to C20 alkyl group substituted by halogen; and m is an integer equal to or greater than 2;

 [Chemical Formula 4]

wherein, in the Chemical Formula 4, $R_{10}$ may be identical or different, and are each independently, halogen; a C1 to C20 alkyl group; or a C1 to C20 alkyl group substituted by halogen; and J is aluminum or boron;

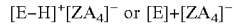 [Chemical Formula 5]

wherein, in the Chemical Formula 5, E is neutral or cationic Lewis base; H is a hydrogen atom; Z is Group 13 element; A may be identical or different, and are each independently, a C6 to C20 aryl group or a C1 to C20 alkyl group, of which one or more hydrogen atoms are unsubstituted or substituted by halogen, C1-20 alkyl group, alkoxy or phenoxy.

As the non-limiting examples of the compounds represented by the Chemical Formula 3, methylaluminoxane, ethylaluminoxane, iso-butylaluminoxane or tert-butylaluminoxane, and the like may be mentioned. And, as the non-limiting examples of the compounds represented by the Chemical Formula 4, trimethylaluminum, triethylaluminum, triisobutylaluminum, tripropylaluminum, tributylaluminum, dimethylchloroaluminum, triisopropylaluminum, tri-sec-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide or dimethylaluminum ethoxide, and the like may be mentioned. And, as the non-limiting examples of the compounds represented by the Chemical Formula 5, trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsillyl)-2,3,5,6-tetrafluorophenyl)borate, N,N-dimethylanilinium pentafluorophenoxytris(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-N-dodecylanilinium tetrakis(pentafluorophenyl)borate or methyldi(dodecyl)ammonium tetrakis(pentafluorophenyl)borate, and the like may be mentioned.

The cocatalyst may be included at a mole ratio of 1 to 20, based on one mole of the metallocene compound including the first and second transition metal compounds. When included at the above mole ratio range, the effect obtained by the cocatalysts may be achieved beyond a certain level, and the properties of homopolyethylene prepared through the effective activation of the metallocene compound may be appropriately controlled.

Such a hybrid supported catalyst may be prepared, for example, by supporting a cocatalyst in a carrier, and supporting catalyst precursor first and second transition metal compounds in the cocatalyst-supported carrier. For specific preparation method of the hybrid supported catalyst, examples described below may be referred to. However, the preparation method of the hybrid supported catalyst is not limited thereto, it may additionally adopt steps commonly used in the art, and the step(s) of the preparation method may be modified by commonly modifiable step(s).

And, the hybrid supported catalyst may be introduced into a polymerization reaction while dissolved or diluted in a C5-12 aliphatic hydrocarbon solvent, such as pentane, hexane, heptane, nonane, decane and isomers thereof; an aromatic hydrocarbon solvent such as toluene, benzene, and the like; or a hydrocarbon solvent substituted by a cholrine atom such as dichloromethane, chlorobenzene, and the like. Wherein, it is preferable that the solvent used may be treated with a small amount of alkyl aluminum, so as to remove a small amount of water or air acting as a catalyst poison, and it is also possible to further use a cocatalyst.

And, the alpha olefin that can be used when preparing ethylene copolymer may be C4-20 alpha olefin such as 1-butene, 1-pentene, 1-hexene, 1-octene, 1-decene, 1-dodecene, 1-tetradecene, 1-hexadecene, 1-octadecene, 4-methyl-1-pentene, and the like, and a mixture thereof may be used when preparing the ethylene copolymer. More specifically, it may be 1-butene.

For the polymerization reaction of ethylene and alpha olefin, various polymerization processes known as the polymerization reaction of olefin monomers such as continuous solution polymerization, bulk polymerization, suspension polymerization, slurry polymerization, or emulsion polymerization, and the like may be adopted.

And, during the polymerization reaction, hydrogen may be introduced at the velocity of 0.1 to 0.5 g/hr, more specifically, 0.2 to 0.5 g/hr, under reactor pressure of 1 atm. When hydrogen gas is introduced at the above velocity, the SCB content in the prepared copolymer may be easily controlled within the above described range, while exhibiting sufficient catalytic activity.

The hydrogen gas functions for activating the non-active sites of a metallocene compound, and causing a chain transfer reaction to control molecular weight, and in the present invention, by controlling hydrogen input within the above described range, MI of the prepared ethylene copolymer may be controlled to 0.5 g/10 min or less. If the hydrogen gas input exceeds 0.5 g/hr during the polymerization reaction, it may be difficult to decrease the MI of ethylene copolymer to 0.5 g/10 min or less, and in this case, it may be difficult to realize the effect of improvement in the long term durability and mechanical properties of the resin composition. And, if the hydrogen gas input is less than 0.1 g/hr, although MI of ethylene copolymer may be decreased, double bonds may remain in the chain, and thus, may be broken at an early stage when aged.

Although hydrogen input during the polymerization reaction has the largest influence on the SCB content in the finally prepared ethylene copolymer, the above described alpha olefins may also have an influence on the SCB content. Thus, in the present invention, while fulfilling the hydrogen input range, alpha olefins may be introduced in an amount such that SCB per 1,000 carbon atoms atoms in the ethylene copolymer may become 6 or less, more specifically, 3 to 6. Specifically, the alpha olefins may be introduced in an amount of 2.0 to 3.0 ml/min, based on the introduction of 10 kg/hr of ethylene monomers. If introduced in the above content range, ethylene copolymer fulfilling the above explained SCB condition may be easily prepared. However, if the input of alpha olefin monomers is less than 2.0 ml/min, or exceeds 3.0 ml/min, it may be difficult to prepare ethylene copolymer fulfilling the above described SCB condition.

And, a temperature during the polymerization reaction may be 25 to 500° C., specifically 25 to 200° C., more specifically 50 to 150° C. And, the polymerization pressure may be 1 to 100 bar, specifically 1 to 50 bar, more specifically 5 to 30 bar.

The ethylene copolymer may be included in the content of 25 to 75 wt %, based on the total weight of the polyolefin resin composition. If the content of the ethylene copolymer is less than 25 wt %, it may be difficult to obtain processibility improvement effect due to the inclusion of the ethylene copolymer, and if it exceeds 75 wt %, life characteristic may be deteriorated. Considering the effect of improvement in the processibility and life characteristic of the polyolefin resin composition according to the control of the content of ethylene copolymer, the ethylene copolymer may be include in the content of 50 to 75 wt %, based on the total weight of the resin composition.

Polyolefin Resin Composition

The polyolefin resin composition according to one embodiment of the present invention may be prepared by mixing the above described i) homopolyethylene and ii) ethylene copolymer by a common polymer mixing method.

Specifically, it may be prepared by a method comprising the steps of: polymerizing ethylene monomers and alpha olefins having a carbon number of 4 or more, while introducing hydrogen in the amount of 0.1 to 0.5 g/hr, in the presence of a hybrid supported catalyst in which a first transition metal compound of the above Chemical Formula 1 and a second transition metal compound of the above Chemical Formula 2 are supported together in a carrier, to prepare ethylene copolymer comprising repeat units derived from alpha olefin having a carbon number of 4 or more, having melt index of 0.5 g/10 min or less (measured at 190° C. under a load of 2.16 kg according to ASTM D1238), and having average short chain branch (SCB) number per 1,000 carbon atoms of 6 or less in a molecular weight distribution graph measured by GPC-FTIR; and mixing the ethylene copolymer with homopolyethylene having melt index (measured at 190° C. under a load of 2.16 kg according to ASTM D1238) of 0.8 g/10 min or less, at a weight ratio of 3:1 to 1:3, wherein the alpha olefins are introduced in an amount of 2.0 to 3.0 ml/min, based on the introduction of 10 kg/hr of the ethylene monomers.

And, the preparation method may further comprise a step of polymerizing ethylene monomers while introducing hydrogen in an amount of 0.1 to 1.5 g/hr, in the presence of a hybrid supported catalyst in which a first transition metal compound of the above Chemical Formula 1 and a second transition metal compound of the above Chemical Formula 2 are supported together in a carrier, to prepare homopolyethylene having melt index (measured at 190° C. under a load of 2.16 kg according to ASTM D1238) of 0.8 g/10 min or less, after preparing the ethylene copolymer and before mixing the ethylene copolymer with homopolyethylene, or before preparing the ethylene copolymer.

In the preparation method of the polyolefin resin composition, the hybrid supported catalyst used for the preparation of ethylene copolymer and homopolyethylene, and preparation methods of copolymer and homopolymer using the same are as explained above.

And, the i) homopolyethylene and the ii) ethylene copolymer may be, for example, dry mixed using a henschel mixer, a tumbler mixer, and the like, or the dry mixed mixture may be additionally melt mixed using an extruder, a mixing roll, a roll mill, a kneader, a banbury mixer, and the like.

Wherein, the i) homopolyethylene and the ii) ethylene copolymer may be mixed at a weight ratio of 3:1 to 1:3. If the mixing ratio of the homopolyethylene and the ethylene copolymer does not fall within the above range and the content of homopolyethylene is excessively high exceeding 3:1, there is a concern about deterioration of life characteristics, and if the content of ethylene copolymer is excessively high exceeding 1:3, there is a concern about processibility deterioration. More preferably, the i) homopolyethylene and the ii) ethylene copolymer may be mixed and included at a weight ratio of 1:1 to 1:3.

And, when mixing the homopolyethylene and the ethylene copolymer, one or more additives such as an antioxidant, an antistatic agent, a slip agent, an anti-blocking agent, a lubricant, dye, pigment, a plasticizer, or an anti-aging agent, and the like may be further added. Such additives may be included in an appropriate content within a range where the properties of the resin composition is not hindered, and specifically, it may be included in the content of 0.1 to 1 part by weight, based on 100 parts by weight of the mixture of the homopolyethylene and ethylene copolymer.

The polyolefin resin composition mixed and prepared as described above has, under density measured according to ASTM D1505 of 0.930 to 0.960 g/cc, MI measured at 190° C. under a load of 2.16 kg according to ASTM D1238, of 0.1 to 0.5 g/10 min; the ratio of $MI_5/MI_{2.16}$ (MFRR) less than 3.1; molecular weight distribution of 2.5 to 4.2; and rheological properties measured using a rheometer after storing at 240° C. for 2,000 seconds under an oxic condition, specifically, normalized viscosity calculated from viscosity change according to the above Equation 1, of 20 to 30%. As described above, it may exhibit low normalized viscosity of 20 to 30% as well as low MI, while maintaining excellent properties with narrow MFRR less than 3.1, thus exhibiting excellent effects in terms of processability and long term life characteristic as well as basic properties.

More specifically, the polyolefin resin composition has, under density measured according to ASTM D1505 of 0.940 to 0.950 g/cc, MI measured at 190° C. under a load of 2.16 kg according to ASTM D1238 of 0.2 to 0.5 g/10 min; the ratio of $MI_5/MI_{2.16}$ (MFRR) of 2 to 3; molecular weight distribution of 2.5 to 4.0; and rheological properties measured using a rheometer after storing at 240° C. for 2,000 seconds under an oxic condition, namely, normalized viscosity calculated from viscosity change according to the above Equation 1, of 25 to 30%, thus exhibiting further improved mechanical properties and long term durability.

And, the resin composition exhibits decreased residual stress due to low MI. Specifically, the residual stress (at 100 s, 140° C.) of the resin composition may be less than 1%, or 0.01% or more and less than 1%, more specifically 0.1 to 0.4%. Since the polyolefin resin composition has decreased residual stress of the above explained range together with the above explained property requirements, it may exhibit further improved long term durability.

Meanwhile, the residual stress of the polyolefin resin composition may be measured by DMA (Dynamic Mechanical Analysis). For example, after taking the polyolefin resin composition and applying 200% strain, change in the residual stress for 100 seconds may be measured. Wherein, as the measuring equipment, Discovery Hybrid Rheometer (DHR) manufactured by TA Instruments, and the like may be used.

And, the polyolefin resin composition may have weight average molecular weight (Mw) measured by GPC of 50,000 to 250,000 g/mol. Since the polyolefin resin composition has weight average molecular weight of the above explained range together with the above explained property requirements, it may exhibit excellent mechanical strength while exhibiting appropriate processability.

Meanwhile, throughout the specification, the weight average molecular weight (Mw) of the resin composition means weight average molecular weight (unit:g/mol) converted in terms of polystyrene, measured by GPC, and molecular weight distribution is a value obtained by measuring weight average molecular weight and number average molecular weight (Mn) and calculating the ratio (Mw/Mn) of the weight average molecular weight to the number average molecular weight.

And, the polyolefin resin composition exhibits improved properties, particularly, mechanical strength, and specifically, tensile strength measured according to ASTM D1709A by forming into a film having a thickness of 100 µm is greater than 2.0 gf/den, specifically, greater than 2.4 gf/den, and more specifically, greater than 2.5 gf/den. If tensile strength of the polyolefin resin composition is 2.0 gf/den or less, it may be difficult to achieve sufficient strength when the resin composition is applied for a film, particularly, for a stretch film.

Thus, according to yet another embodiment of the present invention, a film comprising the polyolefin resin composition or prepared using the same, more specifically, a stretch film is provided.

The film may be prepared by applying various shaping methods, conditions, and equipment known in the field of polymer shaping such as a T-die method, and the like, without limitations.

According to yet another embodiment of the present invention, a bale net comprising the polyolefin resin composition or prepared using the same is provided.

The bale net may be prepared using a common bale net preparation method, except using the above described resin composition, and by using the resin composition, remarkably improved long term durability may be exhibited while exhibiting excellent mechanical properties and processability.

Advantageous Effects

The polyolefin resin composition according to the present invention has excellent long term durability and improved properties, and thus, is useful for a film, particularly, for a stretch film.

DESCRIPTION OF THE DRAWINGS

FIG. 1 and FIG. 2 are drawings respectively showing the molecular weight distribution curves (full line) and SCB number distributions per 1000 carbon atoms (dots) of the ethylene copolymers prepared in Preparation Example 1 and Preparation Example 2.

FIG. 3 is a drawing showing the molecular weight distribution curve (full line) and SCB number distribution per 1000 carbon atoms (dots) of the polymer in the resin composition used in Comparative Example 4.

MODE FOR INVENTION

The present invention will be explained in more detail in the following examples. However, these examples are presented only as the illustrations of the present invention, and the scope of the present invention is not limited thereby.

Synthesis Example: Preparation of Hybrid Supported Catalyst

Into a 20 L SUS high pressure reactor, 6.0 kg of a toluene solution was introduced and the temperature of the reactor was maintained at 40° C. And, 1,000 g of silica (SYLOPOL™ 948, manufactured by Grace Davison) dehydrated by applying vacuum at 600° C. for 12 hours was introduced into the reactor, and sufficiently dispersed, and then, 80 g of a first metallocene compound (I) of the following structure was dissolved in toluene and introduced, and the resulting solution was stirred at 40° C. for 2 hours to react. Thereafter, stirring was stopped, followed by settling for 30 minutes, and decantation of the reaction solution.

Into the reactor, 2.5 kg of toluene was introduced, 9.4 kg of a solution of 10 wt % methylaluminoxane (MAO)/toluene was introduced, and then, the solution was stirred at 40° C., 200 rpm for 12 hours. After the reaction, stirring was stopped, followed by settling for 30 minutes, and decantation of the reaction solution. And, 3.0 kg of toluene was introduced and stirred for 10 minutes, and then, stirring was stopped, followed by settling for 30 minutes, and decantation of the reaction solution.

Into the reactor, 3.0 kg of toluene was introduced, 314 mL of a solution of 29.2 wt % second metallocene compound (II) of the following structure/toluene was introduced, and then, the resulting solution was stirred at 40° C., 200 rpm for 12 hours. After lowering the temperature of the reactor to a room temperature, stirring was stopped, followed by settling for 30 minutes, and decantation of the reaction solution.

Into the reactor, 2.0 kg of toluene was introduced and stirred for 10 minutes, and then, stirring was stopped, followed by settling for 30 minutes, and decantation of the toluene solution.

Into the reactor, 3.0 kg of hexane was introduced, and the hexane slurry was transferred to a filter dryer, and the hexane solution was filtered. Drying under reduced pressure at 40° C. for 4 hours gave 890 g-SiO$_2$ hybrid supported catalyst.

(I)

(II)

PREPARATION EXAMPLE 1

Preparation of Ethylene Copolymer (COMO)

In the presence of the hybrid supported catalyst prepared in Synthesis Example, ethylene copolymer was prepared using a hexane slurry stirred tank reactor, by unimodal operation of one reactor. As comonomers, 1-butene was used, and the reactor pressure was maintained at 40 bar, and the polymerization temperature was maintained at 90° C.

Ethylene feed : 10.0 kg/hr

Hydrogen input: 0.2 g/hr 1-butene input: 2.5 ml/min.

PREPARATION EXAMPLE 2

Preparation of Ethylene Copolymer (COMO)

Ethylene copolymer was prepared by the same method as Preparation Example 1, except that hydrogen input was changed to 0.7 g/hr.

PREPARATION EXAMPLE 3

Preparation of Ethylene Copolymer (COMO)

Ethylene copolymer was prepared by the same method as Preparation Example 1, except that 1-butene input was changed to 3.5 ml/min.

PREPARATION EXAMPLE 4

Preparation of Homopolyethylene (HOMO)

In the presence of the hybrid supported catalyst prepared in Synthesis Example, homopolyethylene was prepared using a hexane slurry stirred tank reactor, by unimodal operation of one reactor (MI=0.6 g/10 min, density=0.952 g/cc, see Table 1 below). The reactor pressure was maintained at 40 bar, and the polymerization temperature was maintained at 90° C.

Ethylene feed : 10.0 kg/hr

Hydrogen input: 0.7 g/hr

PREPARATION EXAMPLE 5

Preparation of Homopolyethylene (HOMO)

Homopolyethylene was prepared by the same method as Preparation Example 4, except that hydrogen input was changed to 2.0 g/hr (MI=1.3 g/10 min, density=0.954 g/cc, see Table 1 below).

EXAMPLE 1

Preparation of a Polyolefin Resin Composition

As shown in the following Table 1, the homopolyethylene prepared in Preparation Example 4 and the ethylene copolymer prepared in Preparation Example 1 were mixed at a weight ratio of 1:1 to prepare a resin composition.

EXAMPLE 2

Preparation of a Polyolefin Resin Composition

As shown in the following Table 1, the homopolyethylene prepared in Preparation Example 4 and the ethylene copolymer prepared in Preparation Example 1 were mixed at a weight ratio of 1:3 to prepare a resin composition.

COMPARATIVE EXAMPLE 1

Preparation of a Polyolefin Resin Composition

As shown in the following Table 1, the homopolyethylene (HOMO) prepared in Preparation Example 4 was used alone.

COMPARATIVE EXAMPLE 2

Preparation of a Polyolefin Resin Composition

As shown in the following Table 1, the ethylene copolymer (COMO) prepared in Preparation Example 1 was used alone.

COMPARATIVE EXAMPLE 3

Preparation of a Polyolefin Resin Composition

As shown in the following Table 1, the ethylene copolymer (COMO) prepared in Preparation Example 2 was used alone.

COMPARATIVE EXAMPLE 4

Preparation of a Polyolefin Resin Composition

As a polyolefin resin composition, ACP7740-F3™ from Basell Company was used (MI: 0.6 g/10 min (measured at 190° C. under a load of 2.16 kg according to ASTM D1238), density: 0.946 g/cc, SCB number per 1000 carbon atoms (SCB per 1000 TC): 4).

COMPARATIVE EXAMPLE 5

Preparation of a Polyolefin Resin Composition

As shown in the following Table 1, the homopolyethylene (HOMO) prepared in Preparation Example 4 and the ethylene copolymer (COMO) prepared in Preparation Example 1 were mixed at a weight ratio of 5:1 to prepare a resin composition.

COMPARATIVE EXAMPLE 6

Preparation of a Polyolefin Resin Composition

As shown in the following Table 1, the homopolyethylene (HOMO) prepared in Preparation Example 4 and the ethylene copolymer (COMO) prepared in Preparation Example 1 were mixed at a weight ratio of 1:5 to prepare a resin composition.

COMPARATIVE EXAMPLE 7

Preparation of a Polyolefin Resin Composition

As shown in the following Table 1, the homopolyethylene (HOMO) prepared in Preparation Example 4 and the ethylene copolymer (COMO) prepared in Preparation Example 2 were mixed at a weight ratio of 1:1 to prepare a resin composition.

COMPARATIVE EXAMPLE 8

Preparation of a Polyolefin Resin Composition

As shown in the following Table 1, the homopolyethylene (HOMO) prepared in Preparation Example 4 and the ethylene copolymer (COMO) prepared in Preparation Example 3 were mixed at a weight ratio of 1:1 to prepare a resin composition.

COMPARATIVE EXAMPLE 9

Preparation of a Polyolefin Resin Composition

As shown in the following Table 1, a resin composition was prepared by the same method as Example 1, except that the homopolyethylene (HOMO) prepared in Preparation Example 5 was used as homopolyethylene (HOMO).

TABLE 1

| | | Example | | Comparative Example | | | | | | | |
|---|---|---|---|---|---|---|---|---|---|---|---|
| | | 1 | 2 | 1 | 2 | 3 | 5 | 6 | 7 | 8 | 9 |
| HOMO | Preparation Example No. | 4 | 4 | 4 | — | — | 4 | 4 | 4 | 4 | 5 |
| | Hydrogen input(g/hr) | 0.7 | 0.7 | 0.7 | — | — | 0.7 | 0.7 | 0.7 | 0.7 | 2 |
| | MI (g/10 min) | 0.6 | 0.6 | 0.6 | — | — | 0.6 | 0.6 | 0.6 | 0.6 | 1.3 |
| | density (g/cc) | 0.952 | 0.952 | 0.952 | — | — | 0.952 | 0.952 | 0.952 | 0.952 | 0.954 |
| COMO | Preparation Example No. | 1 | 1 | — | 1 | 2 | 1 | 1 | 2 | 3 | 1 |
| | Hydrogen input(g/hr) | 0.2 | 0.2 | — | 0.2 | 0.7 | 0.2 | 0.2 | 0.7 | 0.2 | 0.2 |
| | 1-butene input(ml/min) | 2.5 | 2.5 | — | 2.5 | 2.5 | 2.5 | 2.5 | 2.5 | 3.5 | 2.5 |
| | MI (g/10 min) | 0.4 | 0.4 | — | 0.4 | 0.6 | 0.4 | 0.4 | 0.6 | 0.4 | 0.4 |
| | density (g/cc) | 0.946 | 0.946 | — | 0.946 | 0.946 | 0.946 | 0.946 | 0.946 | 0.942 | 0.946 |
| | SCB per 1000TC (number) | 4 | 4 | — | 4 | 4 | 4 | 4 | 4 | 8 | 4 |
| | HOMO:COMO weight ratio | 1:1 | 1:3 | HOMO alone | COMO alone | COMO alone | 5:1 | 1:5 | 1:1 | 1:1 | 1:1 |

In the Table 1, density was measured according to ASTM D1505.

Melt index (MI) was measured at 190° C. under a load of 2.16 kg according to ASTM D1238.

SCB (short chain branch; number/1,000 C) was measured as follows. The molecular weight distribution curves of the polymer chains making up the ethylene copolymers prepared in Preparation Examples 1 and 2 were derived using GPC (Gel Permeation Chromatography), and indicated as continuous curves in FIG. 1 and FIG. 2. And, each ethylene copolymer was analyzed by FT-IR to derive the distribution of SCB per 1000 carbon atoms (right Y-axis) according to the molecular weight of the polymer chains (X-axis), which is then indicated as a discontinuous dotted line in FIG. 1 and FIG. 2. From the above results, the average value of SCB per 1000 carbon atoms for the whole molecular weight ranges was measured.

FIG. 1 and FIG. 2 are drawings respectively showing the molecular weight distribution curves (full lines) and the distributions of SCB per 1000 carbon atoms (dotted lines) of the ethylene copolymers prepared in Preparation Example 1 and Preparation Example 2.

For comparison, the molecular weight distribution curve (full line) and the distribution of SCB per 1000 carbon atoms (dotted line) of the polymer in the polyolefin resin composition used in Comparative Example 4 were derived by the same method, and shown in FIG. 3. For reference, the average SCB per 1000 carbon atoms in the polymer of Comparative Example 4 was 4.

EXPERIMENTAL EXAMPLE

For the polyolefin resin compositions prepared in Examples and Comparative Examples, the properties were measured as follows, and the results were shown in the following Table 2.

1) Density (g/cc): measured according to ASTM D1505.

2) Melt index (MI; g/10 min): measured at 190° C. under a load of 2.16 kg according to ASTM D1238, and indicated as the weight (g) of polymer molten for 10 minutes.

3) Melt flow rate ratio (MFRR, $MI_5/MI_{2.16}$): $MI_5$ was measured at 190° C. under a load of 5 kg according to ASTM D1238, and then, MFRR was obtained from the ratio of $MI_5$ to $MI_{2.16}$ measured at 190° C. under a load of 2.16 kg according to ASTM D1238.

4) Weight average molecular weight (Mw; g/mol) and molecular weight distribution (MWD): The weight average molecular weight (Mw) and the number average molecular weight (Mn) of polymer were measured by GPC (gel permeation chromatography, manufactured by Waters Corp.), and molecular weight distribution (MWD) was calculated by dividing the weight average molecular weight by the number average molecular weight.

Specifically, it was measured using Polymer Laboratories PLgel MIX-B 300 mm length column and Waters PL-GPC220 equipment. The evaluation temperature was 160° C., 1,2,4-trichlorobenzene was used as a solvent, and the flow rate was 1 mL/min. A sample was prepared at a concentration of 10 mg/10 mL, and then, fed in an amount of 200 μL. Using a calibration curve obtained using polystyrene standard, Mw and Mn values were derived. As polystyrene standard product, 9 kinds having molecular weights (g/mol) of 2,000/10,000/30,000/70,000/200,000/700,000/2,000,000/4,000,000/10,000,000 were used.

5) Tensile strength (gf/den): The resin compositions prepared in Examples and Comparative Examples were respectively molded into a film having a thickness of 100 μm, and tensile strength was measured according to ASTM D1709A.

Specifically, under the following molding conditions, the resin composition was molded by a T-die method to prepare a film with a thickness of 100 μm and a width of 600 nm.

[Molding Conditions]

Molding machine: 40 mm diameter T-die molding machine screw: L/D 24 screw rpm: 60, molding temperature: 280° C.

6) Normalized viscosity (%): Normalized viscosity was measured based on change in rheological properties, and from the result, long term durability was evaluated.

Specifically, the initial viscosity (Mi) was measured at 240° C. under oxygen free conditions using Discovery Hybrid Rheometer (DHR2, TA Instruments), and then, viscosity after storage (Mf) at 240° C. under the presence of oxygen for 2000 seconds was measured, and change in rheological properties was observed, and normalized viscosity (%) was calculated according to the following Equation 1. The smaller value is favorable in terms of long term durability.

$$\text{normalized viscosity} = \left(\frac{Mf - Mi}{Mi}\right) \times 100 \quad \text{[Equation 1]}$$

Mi: the initial viscosity of a polyolefin resin composition (measured at 240° C., under oxygen free conditions)

Mf: the viscosity of a polyolefin resin composition, measured after the polyolefin resin composition is stored at 240° C. for 2,000 seconds under the presence of oxygen.

7) Residual stress (at 100 s, 140° C.): measured according to DMA (Dynamic Mechanical Analysis). Specifically, each resin composition according to Examples and Comparative Examples was taken, and 200% strain was applied at 140° C., and then, residual stress change was observed for 100 seconds. Using Discovery Hybrid Rheometer (DHR) of TA Instruments, each resin composition was sufficiently loaded as a sample between the upper and the lower plates respectively having diameter of 25 mm, and dissolved at 140° C., and then, fixed with a gap of 1 mm, and residual stress was measured.

8) Processibility: Bale nets were prepared using the resin compositions of Examples and Comparative Examples. Specifically, each resin composition according to Examples and Comparative Examples was taken to prepare a HDPE film, which is then cut in a machine direction, and drawn 8 times to prepare a bale net, and at this time, the processibility of the resin composition was evaluated according to the following standard.

Good: capable of easily preparing a bale net through drawing

Poor: the film is broken while progressing drawing for the preparation of a bale net

TABLE 2

|  | Example | | Comparative Example | | | | | | | | |
| --- | --- | --- | --- | --- | --- | --- | --- | --- | --- | --- | --- |
|  | 1 | 2 | 1 | 2 | 3 | 4 | 5 | 6 | 7 | 8 | 9 |
| Density(g/cc) | 0.948 | 0.947 | 0.952 | 0.946 | 0.946 | 0.946 | 0.951 | 0.946 | 0.948 | 0.945 | 0.949 |
| MI (g/10 min) | 0.5 | 0.4 | 0.6 | 0.4 | 0.6 | 0.6 | 0.6 | 0.4 | 0.5 | 0.5 | 1.0 |
| MFRR | 3.0 | 3.0 | 2.9 | 2.9 | 2.9 | 3.3 | 2.9 | 2.9 | 3.0 | 3.3 | 3.7 |
| Mw(g/mol, K = x10$^3$) | 190K | 190K | 190K | 190K | 180K | 190K | 190K | 180K | 180K | 180K | 170K |
| MWD | 4.0 | 4.0 | 3.0 | 4.0 | 4.0 | 5.0 | 4.0 | 4.0 | 4.4 | 4.7 | 5.0 |
| Tensile strength (gf/den) | 2.5< | 2.4 | 2.5< | 2.0< | 1.7 | 1.7 | 2.2 | 1.8 | 2.5< | 2.0 | 1.5 |
| Normalized viscosity (%) | 26 | 27 | 24 | 33 | 35 | 22 | 26 | 33 | 34 | 37 | — |
| Residual stress(at 100 s, 140° C.) (%) | 0.30 | — | — | 0.44 | 0.22 | 0.18 | — | — | — | — | — |
| processibility | good | — | Cannnot be processed | good | good | Good | — | — | — | — | — |

In the Table 2, "—" means not being measured.

As the result of experiments, the resin compositions of Examples 1 and 2 wherein homopolyethylene, and ethylene copolymer prepared in Preparation Example 1 having MI of 0.5 g/10 min or less and SCB of 6 or less are used at the optimum mixing ratio, exhibited excellent effects in terms of processibility and long term durability as well as basic properties, and particularly, exhibited tensile strength greater than 2.0 gf/den, thus also exhibiting remarkably improved effect in terms of mechanical properties.

The invention claimed is:

1. A polyolefin resin composition comprising
   i) a homopolyethylene having a melt index of 0.8 g/10 min or less measured, at 190° C. under a load of 2.16 kg according to ASTM D1238; and
   ii) an ethylene copolymer comprising a repeat unit derived from an alpha olefin having a carbon number of 4 or more, and the ethylene copolymer has a melt index of 0.5 g/10 min or less measured at 190° C. under a load of 2.16 kg according to ASTM D1238, and an average short chain branch (SCB) number of 6 or less per 1,000 carbon atoms in a molecular weight distribution graph measured by GPC-FTIR, wherein the short chain branch has a carbon number of 4 to 7;
   wherein the homopolyethylene and the ethylene copolymer are present at a weight ratio of 3:1 to 1:3, and
   wherein the polyolefin resin composition fulfills the following requirements 1) to 5):
   1) a density of 0.930 to 0.960 g/cc measured according to ASTM D1505,
   2) a melt index of 0.1 to 0.5 g/10 min measured at 190° C. under a load of 2.16 kg according to ASTM D1238,
   3) a melt flow rate ratio (MI$_5$/MI$_{2.16}$) of less than 3.1,
   4) a molecular weight distribution of 2.5 to 4.2,
   5) a normalized viscosity of 20 to 30% according to the following Equation 1:

$$\text{normalized viscosity} = \left(\frac{Mf - Mi}{Mi}\right) \times 100 \quad \text{[Equation 1]}$$

wherein:
   Mi is an initial viscosity of a polyolefin resin composition, which is measured at 240° C., under oxygen free conditions, and
   Mf is a viscosity of a polyolefin resin composition, which is measured after the polyolefin resin composition is stored at 240° C. for 2,000 seconds under the presence of oxygen.

2. The polyolefin resin composition according to claim 1, wherein the polyolefin resin composition has a weight average molecular weight of 50,000 to 250,000 g/mol measured by gel permeation chromatography.

3. The polyolefin resin composition according to claim 1, wherein the polyolefin resin composition has a tensile strength of greater than 2.0 gf/den, as measured according to ASTM D1709A by forming it into a film having a thickness of 100 μm.

4. The polyolefin resin composition according to claim 1, wherein the polyolefin resin composition has a residual stress of less than 1% measured according to dynamic mechanical analysis (DMA) at 100 s, 140° C.

5. The polyolefin resin composition according to claim 1, wherein the polyolefin resin composition has a density of 0.940 to 0.950 g/cc measured according to ASTM D1505, a melt index of 0.2 to 0.5 g/10 min measured at 190° C. under a load of 2.16 kg according to ASTM D1238, a melt flow rate ratio (MI$_5$/MI$_{2.16}$) of 2 to 3, a molecular weight distribution of 2.5 to 4.0, a normalized viscosity of 25 to 30% according to Equation 1, and a residual stress of 0.1 to 0.4% measured according to dynamic mechanical analysis (DMA) at 100 s, 140° C.

6. The polyolefin resin composition according to claim 1, wherein the homopolyethylene has a melt index of 0.4 to 0.8 g/10 min measured at 190° C. under a load of 2.16 kg according to ASTM D1238, and a density of 0.940 to 0.960 g/cc measured according to ASTM D1505.

7. The polyolefin resin composition according to claim 1, wherein the alpha olefin having a carbon number of 4 or more is 1-butene.

8. The polyolefin resin composition according to claim 1, wherein the ethylene copolymer has a melt index of 0.1 to 0.4 g/10 min measured at 190° C. under a load of 2.16 kg according to ASTM D1238, an average SCB number of 3 to 6 per 1,000 carbon atoms in a molecular weight distribution graph measured by GPC-FTIR, and a density of 0.940 to 0.950 g/cc measured according to ASTM D1505.

9. A method for preparing a polyolefin resin composition comprising:

polymerizing ethylene and an alpha olefin having a carbon number of 4 or more, while introducing hydrogen in an amount of 0.1 to 0.5 g/hr, in the presence of a hybrid supported catalyst in which a first transition metal compound of the following Chemical Formula 1 and a second transition metal compound of the following Chemical Formula 2 are supported together on a carrier, to prepare an ethylene copolymer comprising a repeat unit derived from the alpha olefin having a carbon number of 4 or more, wherein the ethylene copolymer has a melt index of 0.5 g/10 min or less measured at 190° C. under a load of 2.16 kg according to ASTM D1238, and an average short chain branch (SCB) number of 6 or less per 1,000 carbon atoms in a molecular weight distribution graph measured by GPC-FTIR; and mixing the ethylene copolymer with a homopolyethylene having a melt index of 0.8 g/10 min or less measured at 190° C. under a load of 2.16 kg according to ASTM D1238 at a weight ratio of 3:1 to 1:3, wherein the alpha olefin is introduced in an amount of 2.0 to 3.0 ml/min, based on an introduction of 10 kg/hr of the ethylene, $(Cp^1(R^a)_x)_n(Cp^2(R^b)_y)M^1Z^1_{3-n}$ [Chemical Formula 1]

wherein, in Chemical Formula 1, $M^1$ is Group 4 transition metal;

$Cp^1$ and $Cp^2$ are identical or different, and are each independently, cyclopentadienyl, indenyl, 4,5,6,7-tetrahydro-1-indenyl or fluorenyl radical, each of which is unsubstituted or substituted with a C1 to C20 hydrocarbon group;

$R^a$ and $R^b$ identical or different, and are each independently, hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^1$ is halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

n is 0 or 1, x and y are each independently, an integer of 0 to 4, $(Cp^3(R^e)_z)B^2(J)M^2Z^2_2$ [Chemical Formula 2]

wherein, in Chemical Formula 2, $M^2$ is Group 4 transition metal;

$Cp^3$ is cyclopentadienyl, indenyl, 4,5,6,7-tetrahydro-1-indenyl or fluorenyl radical, each of which is unsubstituted or substituted with a C1 to C20 hydrocarbon group;

$R^e$ is hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^2$ is halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy;

$B^2$ is one or more radicals containing carbon, germanium, silicon, phosphorus or nitrogen atom or combinations thereof, which crosslink the $(Cp^3(R^e)_z)$ ring with J;

J is selected from the group consisting of $NR^f$, O, $PR^f$ and S, $R^f$ is substituted or unsubstituted C1 to C20 alkyl, or substituted or unsubstituted C6 to C20 aryl, and z is an integer of 0 to 4.

10. The method for preparing a polyolefin resin composition according to claim 9, further comprising a step of homopolymerizing ethylene while introducing hydrogen in an amount of 0.1 to 1 g/hr, in the presence of a hybrid supported catalyst in which a first transition metal compound of the above Chemical Formula 1 and a second transition metal compound of the above Chemical Formula 2 are supported together on a carrier, to prepare the homopolyethylene having a melt index of 0.8 g/10 min or less measured at 190° C. under a load of 2.16 kg according to ASTM D1238, after preparing the ethylene copolymer and before mixing the ethylene copolymer and the homopolyethylene, or before preparing the ethylene copolymer.

11. The method for preparing a polyolefin resin composition according to claim 9, wherein the first transition metal compound is selected from the group consisting of the following compounds:

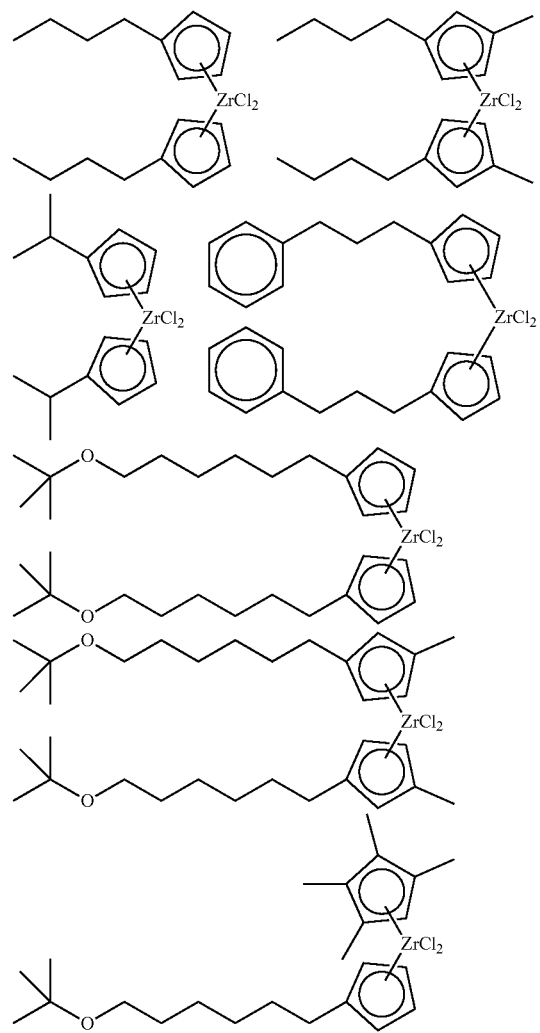

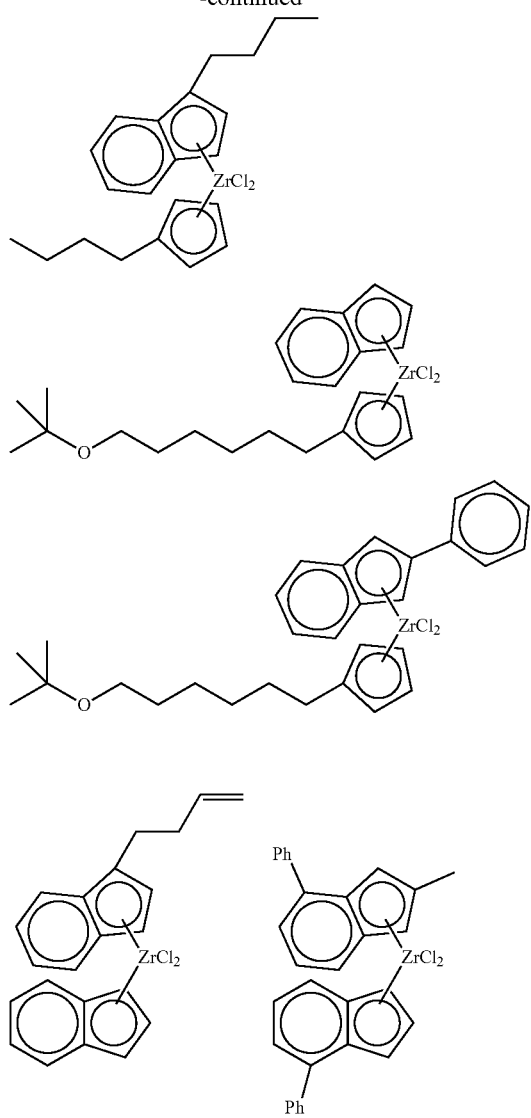
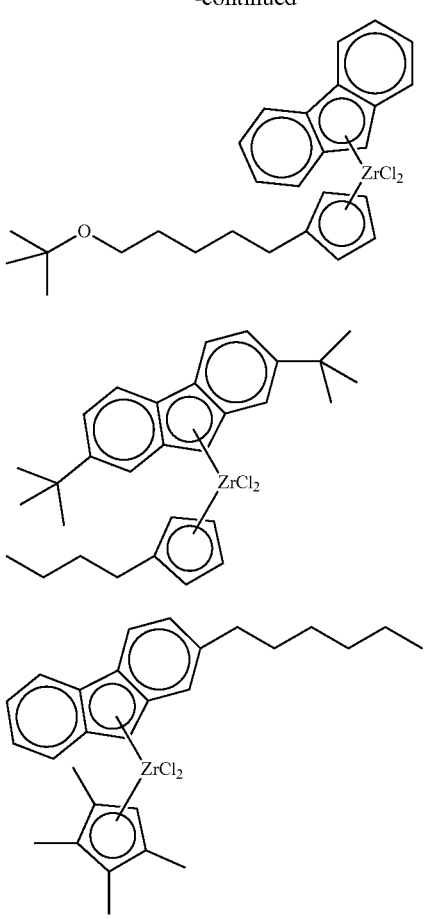
12. The method for preparing a polyolefin resin composition according to claim 9, wherein the second transition metal compound is selected from the group consisting of the following compounds:
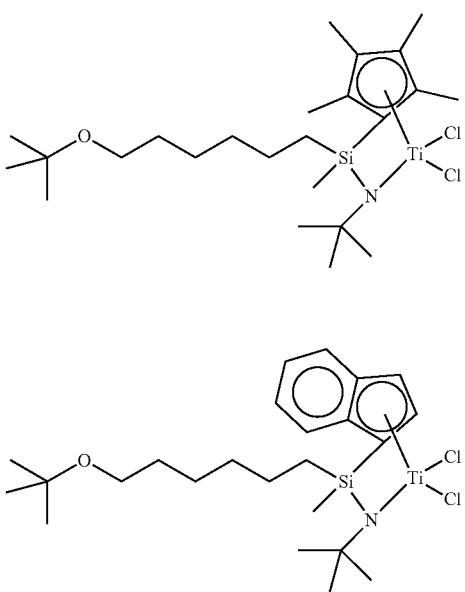

-continued

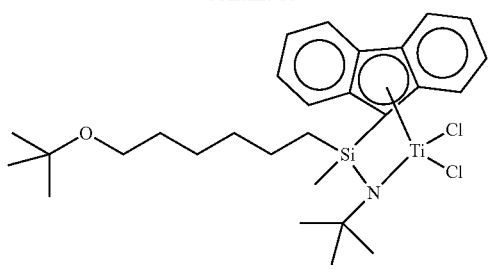

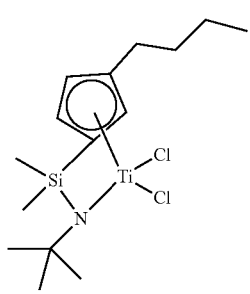

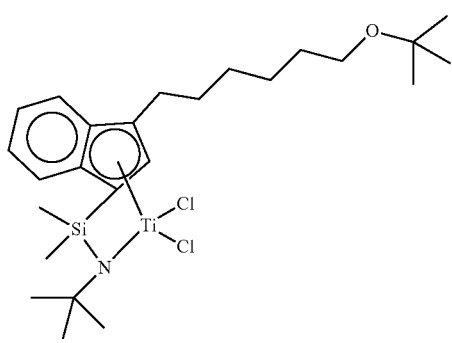

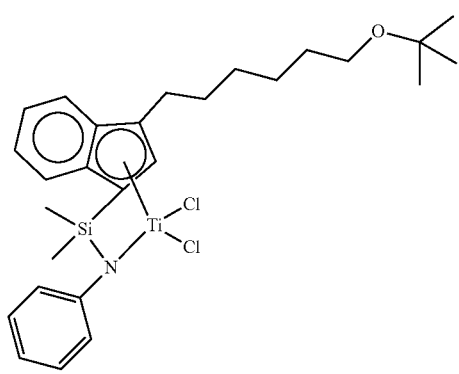

-continued

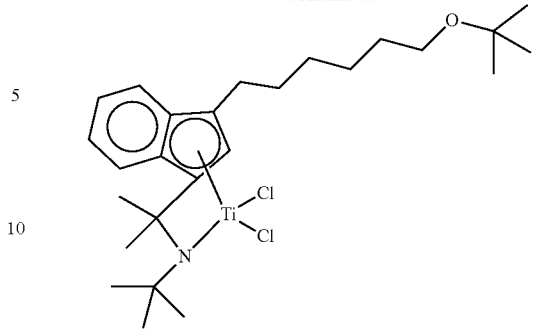

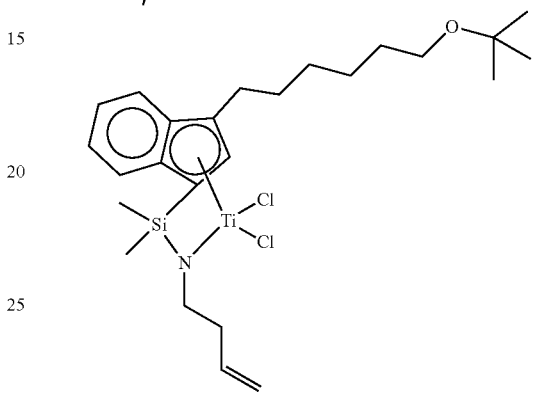

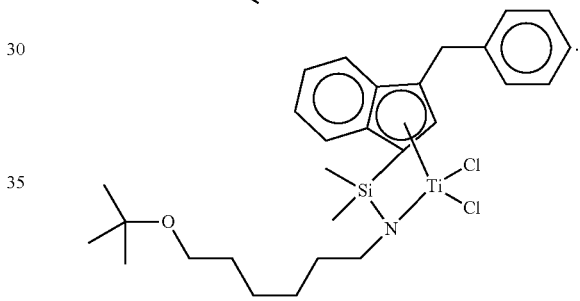

13. An article prepared with the polyolefin resin composition according to claim 1.

14. The article according to claim 13, wherein the article is a stretch film or a bale net.

15. The polyolefin resin composition according to claim 1, wherein the repeat unit derived from the alpha olefin having a carbon number of 4 or more is included in an amount of 1 to 5 mol % in the ethylene copolymer.

16. The method for preparing a polyolefin resin composition according to claim 9, wherein in Chemical Formula 2, $B^2$ is a divalent silane substituted by hydrogen, C1-20 alkyl, C1-20 alkoxy, or C2-20 alkoxyalkyl.

17. The method for preparing a polyolefin resin composition according to claim 9, wherein the first transition metal compound and the second transition metal compound are included at a mole ratio of 1:0.1 to 1:0.9 on the hybrid supported catalyst.

18. The method for preparing a polyolefin resin composition according to claim 9, wherein the polymerizing of the ethylene and the alpha olefin having a carbon number of 4 or more is performed at a temperature of 25 to 500° C., and at a polymerization pressure of 1 to 100 Kgf/cm².

* * * * *